United States Patent
Davison et al.

(10) Patent No.: US 8,230,516 B2
(45) Date of Patent: Jul. 24, 2012

(54) APPARATUS, SYSTEM, AND METHOD FOR NETWORK AUTHENTICATION AND CONTENT DISTRIBUTION

(75) Inventors: James Mathew Davison, Tucson, AZ (US); Christopher Michael Sansone, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 11/334,969

(22) Filed: Jan. 19, 2006

(65) Prior Publication Data

US 2007/0169205 A1    Jul. 19, 2007

(51) Int. Cl.
*G06F 7/00* (2006.01)
(52) U.S. Cl. .......................................... 726/28; 726/11
(58) Field of Classification Search ................ 726/17, 726/21, 4, 2, 26, 27, 28, 29, 30, 11–14; 705/59; 707/2; 717/173, 178
See application file for complete search history.

(56) References Cited

U.S. PATENT DOCUMENTS

| | | | |
|---|---|---|---|
| 6,212,635 B1 * | 4/2001 | Reardon ....................... | 713/165 |
| 6,298,072 B1 * | 10/2001 | Koliczew ...................... | 370/503 |
| 6,463,468 B1 | 10/2002 | Buch et al. ..................... | 709/219 |
| 6,608,697 B1 * | 8/2003 | Schorr et al. ................. | 358/1.15 |
| 7,272,849 B2 * | 9/2007 | Brown ............................ | 726/2 |
| 7,418,452 B2 * | 8/2008 | Maze ............................ | 707/100 |
| 7,526,799 B2 * | 4/2009 | Birk et al. ......................... | 726/9 |
| 2002/0072952 A1 | 6/2002 | Hamzy et al. | |
| 2002/0120756 A1 * | 8/2002 | Lynam et al. ................. | 709/229 |
| 2002/0157026 A1 * | 10/2002 | Brown .......................... | 713/202 |
| 2002/0178053 A1 | 11/2002 | Eaker et al. ..................... | 705/14 |
| 2003/0069788 A1 | 4/2003 | Han ................................. | 705/14 |
| 2003/0088517 A1 * | 5/2003 | Medoff ............................ | 705/59 |
| 2003/0088581 A1 * | 5/2003 | Maze et al. ................. | 707/104.1 |
| 2003/0120557 A1 * | 6/2003 | Evans et al. ..................... | 705/26 |
| 2003/0145316 A1 * | 7/2003 | McKinlay et al. ............. | 717/173 |
| 2003/0167202 A1 | 9/2003 | Marks et al. ..................... | 705/14 |
| 2003/0171985 A1 | 9/2003 | Prabhu et al. ................... | 705/14 |
| 2003/0177207 A1 | 9/2003 | Nagasaka et al. ............. | 709/220 |
| 2003/0219030 A1 * | 11/2003 | Gubbi ............................ | 370/442 |
| 2003/0233580 A1 | 12/2003 | Keeler et al. .................. | 713/201 |
| 2004/0076128 A1 | 4/2004 | Rao et al. ...................... | 370/328 |
| 2004/0083474 A1 * | 4/2004 | McKinlay et al. ............. | 717/176 |

(Continued)

FOREIGN PATENT DOCUMENTS

JP        20020072952 A1    6/2002

(Continued)

*Primary Examiner* — Kim Vu
*Assistant Examiner* — Sayed Beheshti Shirazi
(74) *Attorney, Agent, or Firm* — Kunzler Needham Massey & Thorpe

(57) ABSTRACT

An apparatus, system, and method are disclosed for network authentication and content distribution. The apparatus includes an authentication module configured to receive redirected network requests over a communications network from a firewall module and configured to present a user license agreement and not require user-identifiable information, and a content distribution module configured to synchronize over the communications network with a client module and transmit content to the client module. The system includes a firewall module connected with a global communications network, a network connected with the firewall module, a computing device configured to couple with the network, and the apparatus. The method includes receiving redirected network requests over a communications network from a firewall module, presenting a user license agreement and not requiring user-identifiable information, and synchronizing over the communications network with a client module and transmitting content to the client module.

17 Claims, 6 Drawing Sheets

U.S. PATENT DOCUMENTS

| | | | |
|---|---|---|---|
| 2004/0095368 A1* | 5/2004 | Anderson | 345/700 |
| 2004/0172560 A1* | 9/2004 | Kobayashi et al. | 713/201 |
| 2004/0259553 A1* | 12/2004 | Delaney et al. | 455/445 |
| 2005/0004841 A1* | 1/2005 | Weiss et al. | 705/14 |
| 2005/0021744 A1* | 1/2005 | Haitsuka et al. | 709/224 |
| 2005/0149452 A1* | 7/2005 | Clayton et al. | 705/59 |
| 2005/0192867 A1* | 9/2005 | Haitsuka et al. | 705/14 |
| 2005/0197136 A1* | 9/2005 | Friday et al. | 455/456.1 |
| 2005/0283831 A1* | 12/2005 | Ryu et al. | 726/11 |
| 2005/0289041 A1* | 12/2005 | Chowdary | 705/37 |
| 2006/0007935 A1* | 1/2006 | Bennett et al. | 370/395.5 |
| 2006/0021016 A1* | 1/2006 | Birk et al. | 726/10 |
| 2006/0041638 A1* | 2/2006 | Whittaker et al. | 709/219 |
| 2006/0095956 A1* | 5/2006 | Ashley et al. | 726/4 |
| 2006/0107067 A1* | 5/2006 | Safal et al. | 713/186 |
| 2006/0136993 A1* | 6/2006 | Smith | 726/3 |
| 2006/0155672 A1* | 7/2006 | Lee et al. | 707/1 |
| 2007/0169205 A1* | 7/2007 | Davison et al. | 726/28 |
| 2007/0242645 A1* | 10/2007 | Stephenson et al. | 370/338 |
| 2008/0031208 A1* | 2/2008 | Abhishek et al. | 370/338 |
| 2008/0137833 A1* | 6/2008 | Middleswarth et al. | 379/221.09 |

FOREIGN PATENT DOCUMENTS

JP 2003030519 1/2003

* cited by examiner

APPARATUS, SYSTEM, AND METHOD FOR NETWORK AUTHENTICATION AND CONTENT DISTRIBUTION

BACKGROUND OF THE INVENTION

1. Field of the Invention

This invention relates to providing access to a communications network and more particularly relates to controlling content distribution and network authentication.

2. Description of the Related Art

The global network known as the Internet has grown from a tool used by scientists, researchers, and technology experts to a near necessity for many people throughout the world. The Internet has become a means of communication for people across the globe as well as an entertainment media delivery system. Internet users can access millions of different web sites using their computer and a connection to the Internet. These millions of different websites host files containing text, audio, video and graphics.

Currently, the internet user can access the Internet using a variety of different connections. Initially the majority of the population connected to the Internet using a "dial-up" connection. The dial-up connection is typically limited to 56 Kbytes/second. In the early years of the Internet, the dial-up connection was sufficient for most users. However, as websites hosted increasingly larger files the demand for bandwidth likewise increased. Examples of large files may include news broadcasts, movies, video-based advertising, etc. In other words, any content other than text began to increase the demand for a connection faster than 56 Kbytes/second.

The next generation of network connections is broadly referred to as a "broadband internet" connection. The term "broadband" loosely refers to networks having bandwidths significantly greater than that found in telephony or dial-up networks. Broadband can refer to DSL, cable, wireless, fixed wireless, satellite, fiber, and power-line network connections. Broadband connections have enabled a wide range of applications that were not possible before such as internet phones (VoIP), streaming videos, internet television, internet radio, etc.

Recently a broadband connection is not limited to a physical connection such a phone line or coaxial cable. Wireless technology has enabled users with portable devices, such as laptop computers and cellular phones, to access the internet from anywhere in range of a wireless access point or cell phone tower. Many Internet users carry internet enabled laptops, personal digital assistants, and other electronic devices and are able to access the Internet at any desired location to browse the Internet and read emails. To attract and accommodate customers with these devices, many commercial establishments such as restaurants, coffee shops, and book stores provide Internet access.

Like traditional dial-up or broadband connections, commercial establishments frequently implement a version of a subscription based system to offer Internet access, requiring a username and password. For example, a purchase at the store may be required for access to the Internet for a limited amount of time. Alternatively, Internet access may be provided by the commercial establishment for free.

Currently, some Internet service providers provide Internet access using advertising based access policies. Access to the Internet is provided free to users in exchange for the users viewing advertisements provided to the ISP by content providers. Internet advertising typically consists of images that take up part of the users screen. These images are commonly referred to as "banners." Typical advertising for access policies continuously download banner ads that cycle across the users screen. The content providers pay the ISP for the advertising depending on a variety of factors. Generally, advertisers pay the ISP depending on the number of "click-throughs." The term "click-through" refers to the number of users who click on the advertisement.

However, this advertising based Internet access policy has not proven to be effective at commercial establishments due to customers' privacy concerns and not wanting to provide personal or financial information. Additionally, many Internet users have come to expect that Internet access be anonymous and provided for free. Furthermore, ensuring that financial details and transactions are secure increases the costs of maintaining the network. However, providing free Internet access does nothing to help support the network, and access control and liability may be an issue.

From the foregoing discussion, it should be apparent that a need exists for an apparatus, system, and method for network access and content distribution. Beneficially, such an apparatus, system, and method would provide anonymous network access to users while also distributing content and authenticating users.

SUMMARY OF THE INVENTION

The present invention has been developed in response to the present state of the art, and in particular, in response to the problems and needs in the art that have not yet been fully solved by currently available computing environments. Accordingly, the present invention has been developed to provide an apparatus, system, and method for network authentication and content distribution that overcome many or all of the above-discussed shortcomings in the art.

The apparatus is provided with a plurality of modules configured to functionally execute the necessary steps of network authentication and content distribution. These modules in the described embodiments include an authentication module configured to receive redirected network requests over a communications network from a firewall module, with the authentication module configured to present a user license agreement and not require user-identifiable information, and a content distribution module configured to synchronize over the communications network with a client module and transmit content to the client module.

In one embodiment, the content distribution module redirects network requests to the firewall module upon losing sync with the client module. The authentication module may be configured to allow network requests upon acceptance of the user license agreement and deny network requests upon non-acceptance of the user license agreement.

In a further embodiment, the communications network includes a wireless access point configured to wirelessly couple with a computing device. The computing device may include a browser configured to access a plurality of network resources. Additionally, the client module is configured to operate within the browser. The authentication module may be configured to terminate network access upon the closing of a browser window having the client module.

A system of the present invention is also presented for network authentication and content distribution. In particular, the system, in one embodiment, includes a firewall module connected with a global communications network, and a communications network connected with the firewall module. The communications network may also include a wireless access point. The system, in one embodiment, includes a computing device configured to couple with the network, an authentication module configured to receive redirected network requests over a communications network from the firewall module, the authentication module configured to present a user license agreement without requiring user-identifiable information, a content distribution module configured to synchronize over the communications network with a client module and transmit content to the client module, and the client module configured to operate within the computing device. The system may also include the apparatus as described above.

A method of the present invention is also presented. The method in the disclosed embodiments substantially includes the steps necessary to carry out the functions presented above with respect to the operation of the described apparatus and system. In one embodiment, the method includes receiving redirected network requests over a communications network from a firewall module, presenting a user license agreement and not requiring user-identifiable information, and synchronizing over the communications network with a client module and transmitting content to the client module.

In one embodiment, the method also includes operations to redirect network requests to the firewall module upon losing sync with the client module, and to allow network requests upon acceptance of the user license agreement and deny network requests upon non-acceptance of the user license agreement.

In a further embodiment, the method includes operations to wirelessly couple with a computing device, access a plurality of network resources, and terminate network access upon the closing of a browser window having the client module.

Reference throughout this specification to features, advantages, or similar language does not imply that all of the features and advantages that maybe realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
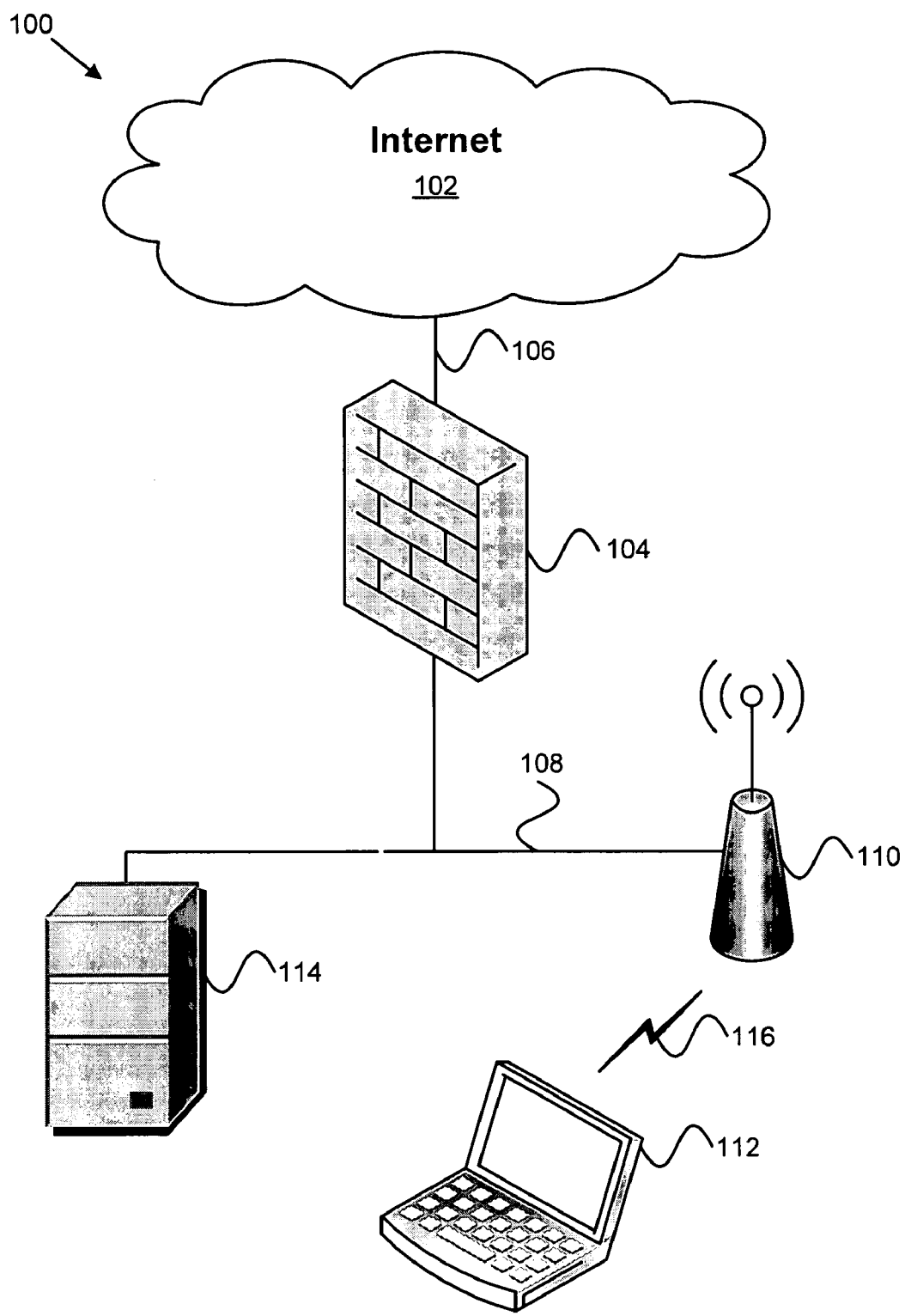
FIG. 1 is a schematic block diagram illustrating one embodiment of a computing environment in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a computing environment 100 in accordance with the present invention. In one embodiment, the computing environment 100 includes a global communications network such as the Internet 102. Coupled to the Internet 102 is a firewall module 104 by way of an internet connection 106. The internet connection 106 may, in one embodiment, be a cable connection, a DSL connection, a T1 connection, a wireless or fixed wireless connection, or any of the Internet Service Provider (ISP) connections offered to end users.

The computing environment 100 may also include a network 108 coupled with the firewall module 104. The network 108 may comprise a Local Area Network (LAN) connecting a plurality of computing devices. The network 108 may be configured as the LAN, or alternatively, a group of LANs connected by the Internet 102, also referred to as a wide area network. In a further embodiment, the network 108 may comprise a wireless local area network (WLAN). Many of the functional units of the network 108, such as routers, switches, hubs, etc., have been omitted for clarity.

The network 108 may include a plurality of devices such as a wireless access point 110, a computing device 112, and a server 114. The wireless access point 110, in one embodiment, is a device that connects one or more wireless-enabled computing devices 112 together to create a wireless network 116. Generally, the wireless access point 110 is connected to a wired network, such as the network 108, and can relay data between computing devices on each side. Furthermore, multiple wireless access points 110 may be connected together to form what is referred to as a "mesh network" that enables a computing device 112 to remain connected while "roaming."

In one embodiment, the computing device 112 is a portable or laptop computer. However, examples of computing devices 112 suitable for use in the present invention include, but are not limited to, cellular phones, personal digital assistants, tablet computers, desktop computers, or other internet-enabled devices. The server 114 may be configured to authenticate users and distribute content. The server 114 will be discussed in greater detail below with reference to FIG. 2.

Figure 2:
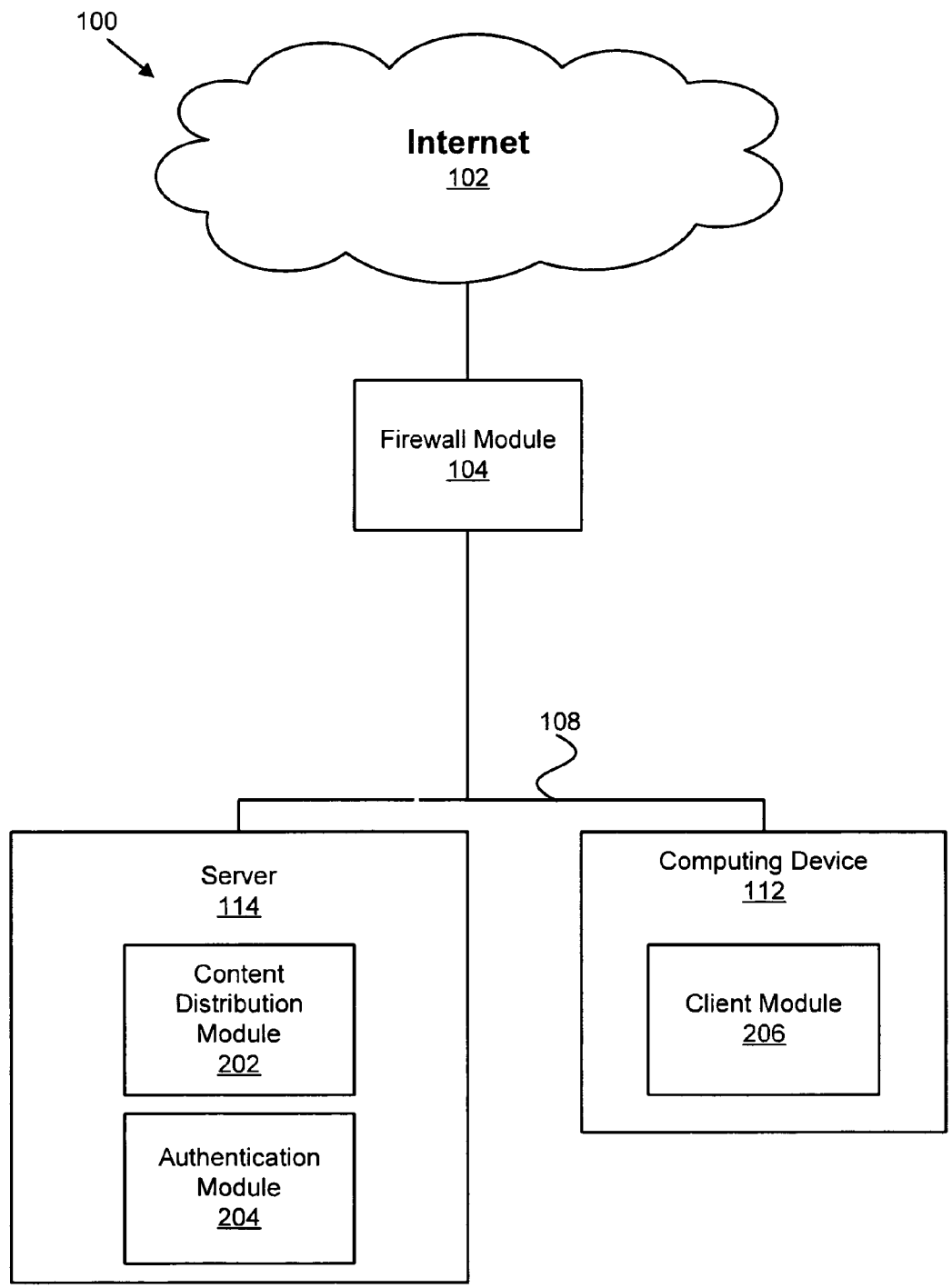
FIG. 2 is a schematic block diagram illustrating one embodiment of the computing environment in accordance with the present invention.

FIG. 2 is a schematic block diagram illustrating one embodiment of the computing environment 100 in accordance with the present invention. In one embodiment, the server 114 comprises a content distribution module 202 and an authentication module 204. The content distribution module 202 maybe configured to communicate or synchronize with a client module 206 operating on the computing device 112 over the network 108. Furthermore, the content distribution module 202 is configured to distribute content such as text, images, audio, and/or video to the client module 206.

In one embodiment, the content may comprise various forms of internet advertising. Internet advertising may consist of images that take up a portion of a screen of the computing device 112. Examples of internet advertising suitable for use with the present invention include, but are not limited to, banner ads, pop-up ads, pop-under ads, ads embedded in a web page, etc. The client module 206 is configured to receive content from the content distribution module 202 and present the content to the user visually or audibly. Furthermore, the client module 206 may be configured to continuously cycle through advertisements distributed by the content distribution module 202.

In one embodiment, the content distribution module 202 "pushes" the content to the client module 206. Alternatively, the client module 206 may download the content in a manner similar to how a browser views a web page.

The firewall module 104 is configured to receive content requests from the computing device 112. In one embodiment, a computing device 112 that has not associated with the network 108 previously is redirected by the firewall module 104 to the authentication module 204. The authentication module 204 may be configured to present a user license agreement (not shown). A user license agreement suitable for use with the present invention may prompt the user to accept the presence of the client module 206 operating on the user's computing device 112. Such an implementation allows the computing environment to provide authentication without requiring user-identifiable information, such as usernames and passwords. Many people are wary of submitting personal information over a public wireless network, and therefore avoid computing environments that require user-identifiable information. The present invention allows a network to generate income through advertisements without requiring user-identifiable information.

The authentication module 204 is further configured to terminate the connection between the network 108 and the computing device 112 if the user does not agree to the user license agreement. In a further embodiment, the authentication module 204 is configured to create an instance of the client module 206 in the computing device 112 upon acceptance of the user license agreement by the user.

The client module 206 may comprise a web-based applet running within a browser of the computing device 112. For example, the client module 206 may comprise a Java™ applet. Alternatively, examples of the client module 206 may include, but are not limited to, Macromedia Flash™. The content distribution module 202 and the client module 206 are configured to synchronize over the network 108. The content distribution module 202 requires that the client module 206 maintain communication with content distribution module 202 so that the status of the computing device 112 is known by the server 114.

The content distribution module 202 module, in one embodiment, is further configured to track how the user responds to the advertisements. In a further embodiment, the content distribution module 202 tracks the "click-through" rate of each individual advertisement presented to the user. Internet advertisement tracking is well known to those skilled in the art and will not be given further discussion herein.

Figure 3:
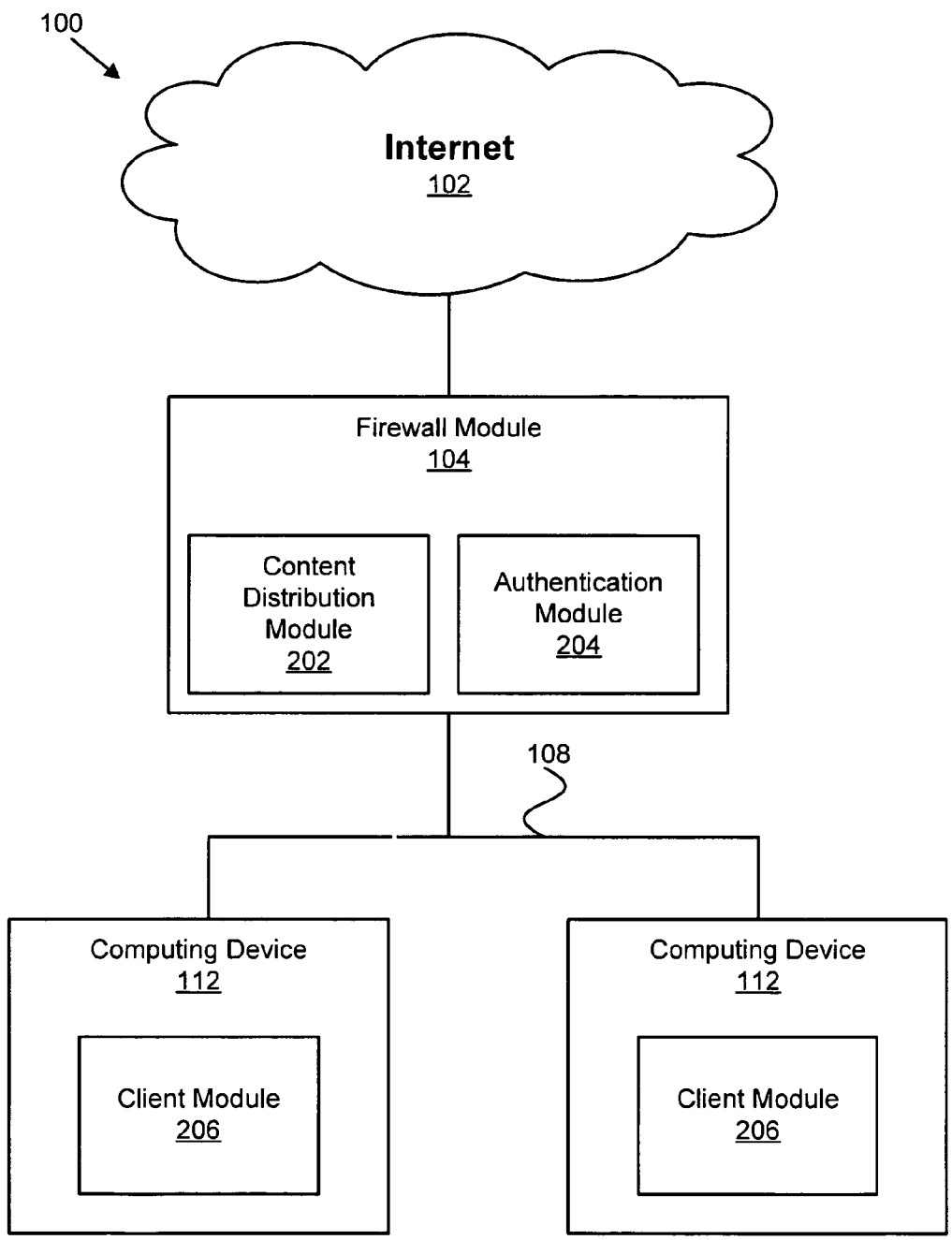
FIG. 3 is a schematic block diagram illustrating an alternative embodiment of a computing environment in accordance with the present invention.

FIG. 3 is a schematic block diagram illustrating an alternative embodiment of a computing environment 300 in accordance with the present invention. In one embodiment, the content distribution module 202 and the authentication module 204 are consolidated into the firewall module 104. The firewall module 104 may be implemented as a custom firmware developed to operate on a router having a built-in firewall. Furthermore, the content distribution module 202 and the authentication module 204 may be incorporated into the firmware of the firewall module 104.

As described above with reference to FIG. 2, the firewall module 104 is configured to receive Internet requests from the computing devices 112 over the network 108. In a further embodiment, the firewall module 104 may be incorporated into an "all-in-one" Internet appliance having router, wireless, and firewall capabilities. Therefore, the firewall module 104 may be configured to receive Internet requests wirelessly from the computing devices 112.

Figure 4:
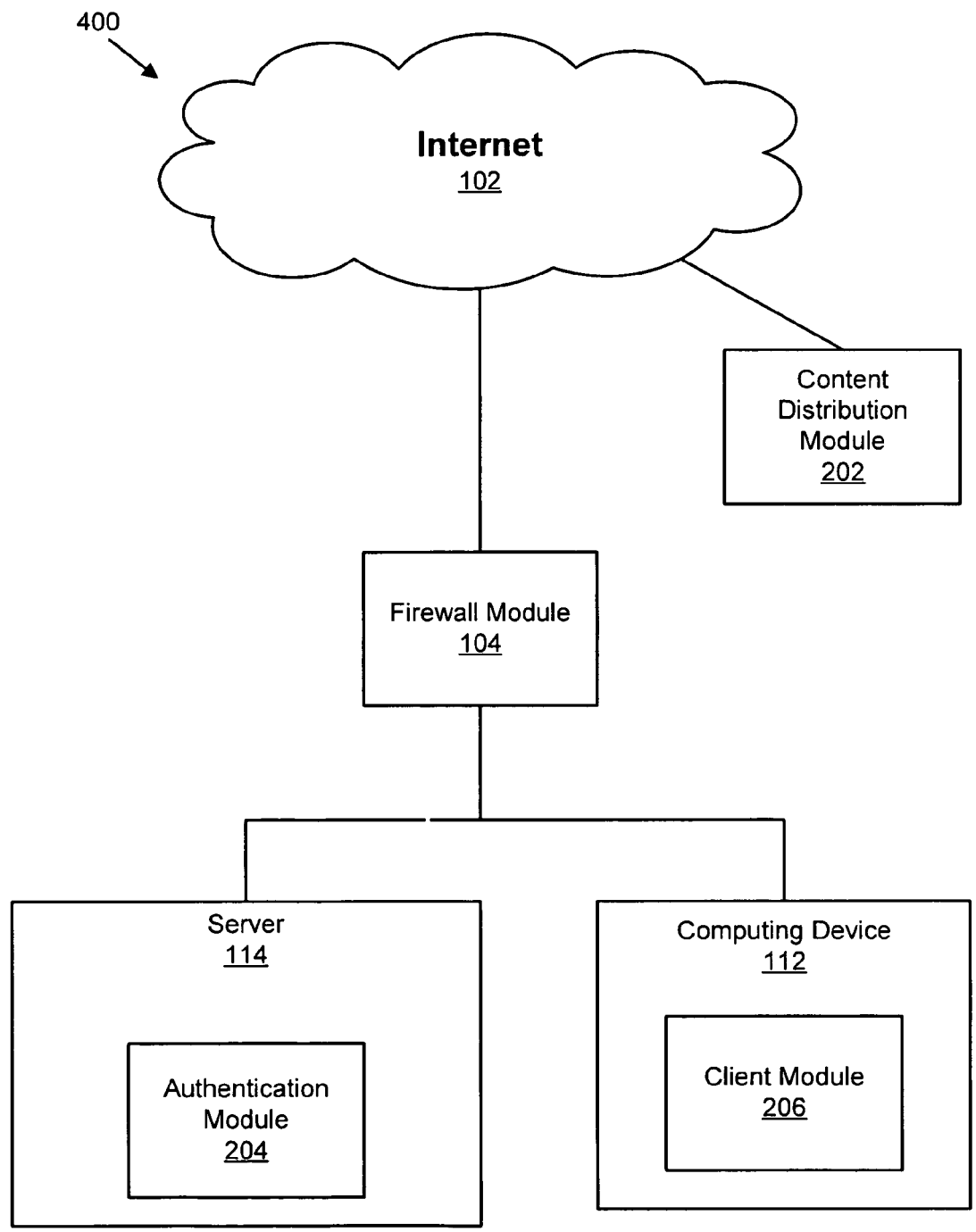
FIG. 4 is a schematic block diagram illustrating another embodiment of a computing environment in accordance with the present invention.

FIG. 4 is a schematic block diagram illustrating another embodiment of a computing environment 400 in accordance with the present invention. In one embodiment, the content distribution module 202 may be located outside the firewall module 104 and be accessible through the Internet 102. A configuration such as this allows the content distribution to be handled by a firm such as Google™, or DoubleClick™.

In a further embodiment, the firewall module 104 is configured to intercept Internet 102 requests by the computing device 112 and forward the Internet request to the authentication module 204. After the user license agreement is accepted and the client module 206 is running on the client device 112, the firewall module 104 allows access to the Internet 102. The client module 206 subsequently synchronizes over the Internet 102 with the content distribution module 202. In such a manner, global content may be presented by the content distribution module 202. In one embodiment, global content may comprise advertisements from large national organizations.

In an alternative embodiment, such as is described above with reference to FIGS. 2 and 3, the content distribution module 202 may be configured to present localized content. For instance, the content distribution module 202 may present content related to the locale of the computing environment. One example might include a coffee shop having a wireless network. After a user has associated with the network 108 and the client module 206 is operating on the computing device 112, the content distribution module 202 may present a coupon for coffee to the user.

A further example might include a computing environment 400 established at a sports complex such as a professional baseball field. In such an environment, advertisements directed toward local places of business such as local restaurants and bars may be presented to visitors. One benefit of the present invention, in this example, would be the ability to present a coupon to the visitors of the game upon a certain amount of home runs being hit.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
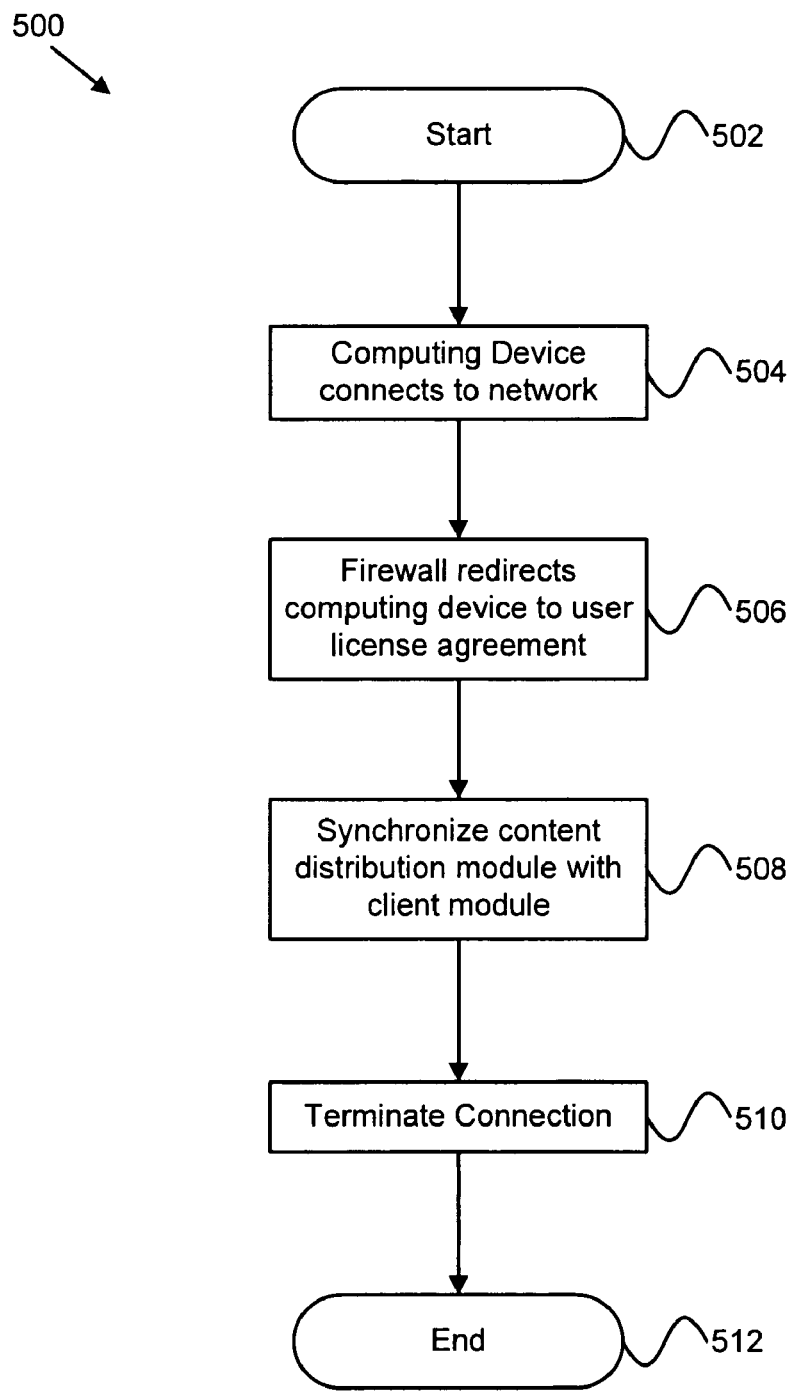
FIG. 5 is a schematic flow chart diagram illustrating one embodiment of a method for network authentication and content distribution in accordance with the present invention.

FIG. 5 is a schematic flow chart diagram illustrating one embodiment of a method 500 for network authentication and content distribution in accordance with the present invention. In one embodiment, the method 500 starts 502 and a user connects 504 a computing device 112 with the network 108. Connecting 504 a computing device 112 with the network 108 may comprise wirelessly associating with the network, or physically plugging into the network. Steps such as requesting an IP address from a DHCP server have been left out for clarity because such steps are obvious to those skilled in the art of network design.

Once the computing device 112 is associated with the network, a user typically requests content from the Internet 102. Examples of typical Internet 102 requests include, but are not limited to, browsing web pages, checking email, connecting to a work place network using VPN, file transfers, and the like. The firewall module 104 is configured to redirect 506 the first Internet 102 request of a new computing device 112 to the authentication module in order for the user license agreement to be presented. The user is then able to accept or reject the user license agreement.

Once the user license agreement is accepted, the authentication module 204 initiates the client module 206, and the client module 206 synchronizes 508 with the content distribution module 202. The connection may be terminated 510 by either the user or the authentication module 204, at which point the method 500 ends 512.

Figure 6:
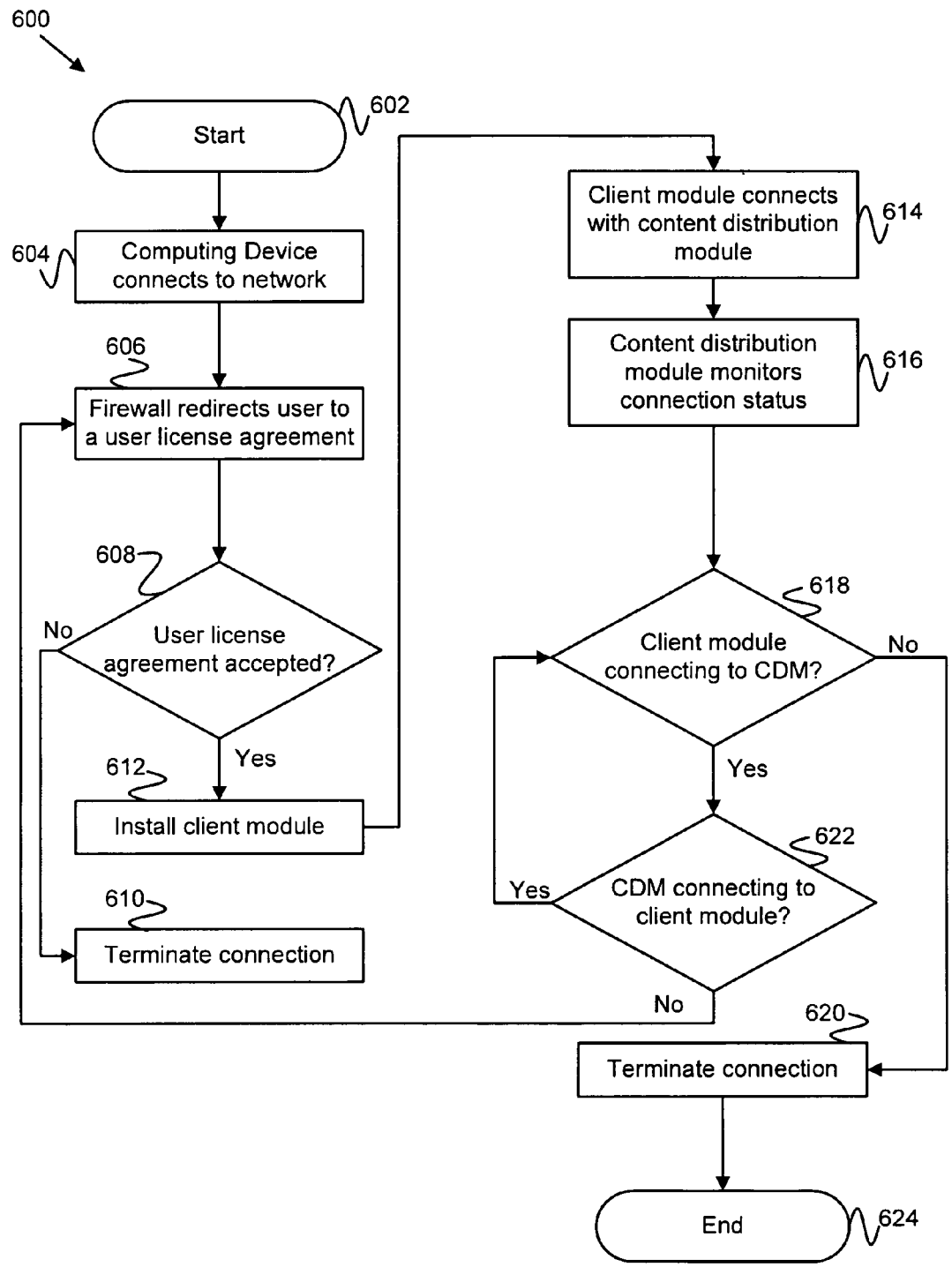
FIG. 6 is a schematic flow chart diagram illustrating an alternative method for network authentication and content distribution in accordance with the present invention.

FIG. 6 is a schematic flow chart diagram illustrating an alternative method 600 for network authentication and content distribution in accordance with the present invention. In one embodiment, the method 600 starts 602 and a computing device 112 connects 604 to the network 108. Connecting 604 with the network, as described above, may comprise wirelessly associating with or physically plugging into the network. The firewall module 104 then detects the presence of the computing device 112 and redirects 606 the computing device to the authentication module 204 to be presented with the user license agreement. In one embodiment, the firewall module 104 may utilize a DHCP request from the computing device 112 as evidence the computing device has not previously associated with the network. Additionally, the firewall module 104 and the authentication module 204 may maintain communication in order to grant or deny access to computing devices 112.

In one embodiment, if the user rejects 608 the user license agreement the firewall module 104 denies access to the Internet 102. In a further embodiment, the firewall module terminates 610 the connection between the computing device 112 and the network 108. Alternatively, if the user accepts 608 the user license agreement, the authentication module 204 installs the client module 206 on the computing device 112. In one embodiment, the client module 206 is an applet operating within a browser program on the computing device 112.

The client module 206 then connects 614 with the content distribution module 202 in order to begin synchronization. In one embodiment, the content distribution module 202 and the client module 206 are located on the same network 108. Alternatively, the content distribution module 202 may be located outside or on the other side of the firewall, and accessible through the Internet 102. The content distribution module 202 then monitors 616 the connection status of the client module 206.

In a further embodiment, if the client module 206 is not connecting 618 to the content distribution module 202, the content distribution module 202 terminates 620 the connection. For example, if the user has closed the browser window having the client module 206, the content distribution module 202 informs the firewall module 104 and the firewall module 104 terminates 620 the connection as described above and the method 600 ends 624.

Alternatively, if the client module 206 is connecting 618 with the content distribution module 202, and the content distribution module is likewise able to connect 622 with the client module, then this synchronization loop continues until the client module 206 is terminated or closed, at which point the connection is also terminated 620 by the firewall module 104. If the client distribution module 202 is unable to connect 622 with the client module 206, the client module 206 is redirected again to the firewall module 104. This restricts users of the network and the client distribution module 202 to the license terms of the session thereby limiting users to conforming to the license agreement requirements. If users attempt to violate the license agreement by terminating the client module 206, the content distribution module 202 and firewall module 104 are configured to detect this and enforce the agreement, thus terminating the connection to the computing device 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for network authentication and content distribution, the apparatus comprising:
    a firewall module that is part of a local area network (LAN) and configured to receive network requests for the Internet from a remote computing device connected to the LAN behind the firewall module, and to redirect at least one redirected network request from the remote computing device to an authentication module that is part of the LAN and behind the firewall module;
    the authentication module configured to:
        receive the redirected network requests over the LAN from the firewall module,
        present a user license agreement on the remote computing device, without requesting user-identifiable information, in response to receiving the redirected network request,
        install a client module comprising executable code on the remote computing device in response to a user of the remote computing device accepting the user license agreement, and to initiate the client module such that the client module displays advertising content on the remote computing device,
        deny the remote computing device Internet access in response to the user rejecting the user license agreement; and
    a content distribution module configured to transmit the advertising content to the client module and to redirect network requests to the firewall module upon losing sync with the client module,
    wherein the authentication module is further configured to terminate the remote computing device's access to the Internet in response to a user terminating the client module on the remote computing device such that the advertising content is not presented to the user on the remote computing device;
    wherein the apparatus comprises at least one of hardware and non-transitory computer readable storage media.

2. The apparatus of claim 1, wherein the authentication module is further configured to allow network requests upon acceptance of the user license agreement and deny network requests upon non-acceptance of the user license agreement.

3. The apparatus of claim 1, wherein the LAN further comprises a wireless access point configured to wirelessly couple with the remote computing device.

4. The apparatus of claim 3, wherein the remote computing device comprises a browser configured to access a plurality of network resources.

5. The apparatus of claim 4, wherein the client module is configured to operate within the browser.

6. The apparatus of claim 5, wherein the authentication module is configured to terminate network access upon the termination of the client module.

7. A system for network authentication and content distribution, the system comprising:
    a local area network (LAN) comprising a wireless access point, the LAN connecting to the Internet;
    a firewall module that is part of the LAN and coupled between the Internet and the LAN, wherein the firewall module is configured to receive network requests for the Internet from a remote computing device connected to the LAN behind the firewall module, and to redirect at least one redirected network request from the remote computing device to an authentication module that is part of the LAN and behind the firewall module;
    the remote computing device configured to couple with the LAN;
    a client module comprising executable code configured to operate within the computing device;
    the authentication module configured to:
        receive the redirected network requests over the LAN from the firewall module,
        present a user license agreement on the remote computing device, without requesting user-identifiable information, in response to receiving the redirected network request,
        install the client module on the remote computing device in response to a user of the remote computing device accepting the user license agreement, and to initiate the client module such that the client module displays advertising content on the remote computing device,
        deny the remote computing device Internet access in response to the user rejecting the user license agreement; and
    a content distribution module configured to transmit the advertising content to the client module and to redirect network requests to the firewall module upon losing synch with the client module,
    wherein the authentication module is further configured to terminate the remote computing device's access to the Internet in response to a user terminating the client module on the remote computing device such that the advertising content is not presented to the user on the remote computing device.

8. The system of claim 7, wherein the authentication module is further configured to allow network requests upon acceptance of the user license agreement and deny network requests upon non-acceptance of the user license agreement.

9. The system of claim 7, wherein the wireless access point is configured to wirelessly couple with the remote computing device.

10. The system of claim 9, wherein the remote computing device comprises a browser configured to access a plurality of network resources.

11. The system of claim 10, wherein the client module is configured to operate within the browser.

12. The system of claim 11, wherein the authentication module is configured to terminate network access upon the termination of the client module.

13. A storage device storing executable code, the code executable by a digital processing apparatus to perform an operation for network authentication and content distribution, the operation comprising:

receiving redirected network requests over a communications network from a firewall module that is part of a local area network (LAN), wherein the firewall module is configured to receive network requests for the Internet from a remote computing device connected to the LAN behind the firewall module, and to redirect at least one redirected network request from the remote computing device to an authentication module that is part of the LAN and behind the firewall module;

presenting a user license agreement on the remote computing device, without requesting user-identifiable information, in response to receiving the redirected network request;

installing a client module comprising executing code on the remote computing device in response to a user of the remote computing device accepting the user license agreement, and initiating the client module such that the client module displays advertising content on the remote computing device;

denying the remote computing device Internet access in response to the user rejecting the user license agreement;

transmitting the advertising content to the client module;

redirecting network requests to the firewall module upon losing sync with the client module;

terminating the remote computing device's access to the Internet in response to a user terminating the client module on the remote computing device such that the advertising content is not presented to the user on the remote computing device.

14. The storage device of claim 13, wherein the operation further comprises an operation to allow network requests upon acceptance of the user license agreement and deny network requests upon non-acceptance of the user license agreement.

15. The storage device of claim 13, wherein the operation further comprises an operation to wirelessly couple with the remote computing device.

16. The storage device of claim 13, wherein the operation further comprises an operation to access a plurality of network resources.

17. The storage device of claim 13, wherein the operation further comprises an operation to terminate network access upon the termination of the client module.

* * * * *